United States Patent
McAlister et al.

(10) Patent No.: US 8,721,513 B2
(45) Date of Patent: May 13, 2014

(54) ELECTRIC MOTOR DRIVE FOR CENTRIFUGAL CONCENTRATOR WITH SUSPENDED ROTOR BOWL

(71) Applicant: Steven A. McAlister, Abbotsford (CA)

(72) Inventors: Steven A. McAlister, Abbotsford (CA); Mark Henry Vinchoff, Burnaby (CA)

(73) Assignee: Sepro Mineral Systems Corp., Langley (CA)

( * ) Notice: Subject to any disclaimer, the term of this patent is extended or adjusted under 35 U.S.C. 154(b) by 0 days.

(21) Appl. No.: 13/687,760

(22) Filed: Nov. 28, 2012

(65) Prior Publication Data
US 2013/0088104 A1 Apr. 11, 2013

Related U.S. Application Data

(62) Division of application No. 12/446,812, filed as application No. PCT/CA2007/001885 on Oct. 23, 2007, now Pat. No. 8,343,025.

(60) Provisional application No. 60/862,498, filed on Oct. 23, 2006.

(51) Int. Cl.
*B04B 9/02* (2006.01)
*H02K 57/00* (2006.01)
*B04B 11/04* (2006.01)

(52) U.S. Cl.
USPC .................................. 494/84; 494/29; 310/58

(58) Field of Classification Search
USPC ........... 494/23–30, 37, 43, 46, 60, 62, 80, 84; 210/360.1, 380.1; 310/52, 58
See application file for complete search history.

(56) References Cited

U.S. PATENT DOCUMENTS

| | | | | |
|---|---|---|---|---|
| 2,140,388 A * | 12/1938 | Lucas | ............................. | 494/80 |
| 3,829,009 A * | 8/1974 | Peck et al. | ...................... | 494/11 |
| 4,286,748 A * | 9/1981 | Bailey | .............................. | 494/29 |
| 4,891,041 A * | 1/1990 | Hohmann et al. | .............. | 494/62 |
| 5,068,554 A | 11/1991 | Mohn | | |
| 5,364,335 A * | 11/1994 | Franzen et al. | .................. | 494/15 |
| 5,462,513 A * | 10/1995 | McAlister | ...................... | 494/56 |
| 5,728,039 A * | 3/1998 | Knelson | .......................... | 494/29 |
| 6,120,261 A | 9/2000 | Al-Towailib | | |
| 6,329,731 B1 * | 12/2001 | Arbanas et al. | .................. | 310/52 |
| 6,597,082 B1 * | 7/2003 | Howard et al. | ............. | 310/254.1 |
| 6,796,934 B1 * | 9/2004 | McAlister et al. | .............. | 494/56 |
| 7,585,269 B2 * | 9/2009 | McAlister | ....................... | 494/26 |
| 8,343,025 B2 * | 1/2013 | McAlister et al. | .............. | 494/29 |
| 2008/0012453 A1 | 1/2008 | Aasgaard | | |
| 2008/0280746 A1 * | 11/2008 | McAlister | ......................... | 494/8 |
| 2010/0240513 A1 * | 9/2010 | McAlister et al. | .............. | 494/37 |
| 2013/0088104 A1 * | 4/2013 | McAlister et al. | .............. | 310/58 |

FOREIGN PATENT DOCUMENTS

| | | | | |
|---|---|---|---|---|
| DE | 102009039729 A1 * | 3/2011 | | |
| WO | WO 9637307 A1 * | 11/1996 | ................ | B04B 1/00 |
| WO | WO 2008049212 A1 * | 5/2008 | ................ | B04B 1/00 |

* cited by examiner

*Primary Examiner* — Charles E Cooley
(74) *Attorney, Agent, or Firm* — Bruce M. Green; Qyen Wiggs Green & Mutala LLP

(57) ABSTRACT

An electric motor is provided with a hollow rotating drive shaft extending along the central axis of the motor, a stationary liquid supply line and a rotating union which communicates with the liquid supply line and the hollow interior of the drive shaft for supplying liquid to the hollow interior of the drive shaft.

9 Claims, 9 Drawing Sheets

ELECTRIC MOTOR DRIVE FOR CENTRIFUGAL CONCENTRATOR WITH SUSPENDED ROTOR BOWL

REFERENCE TO RELATED APPLICATION

This application is a divisional of U.S. patent application Ser. No. 12/446,812 filed on May 8, 2009, now U.S. Pat. No. 8,343,025 B2, which is a national phase of PCT/CA2007/001885 and claims priority from U.S. provisional patent application Ser. No. 60/862,498 filed Oct. 23, 2006, all of which are incorporated herein by reference.

TECHNICAL FIELD

The present invention relates to centrifugal concentrators of the rotating bowl type for the separation of solids of higher density such as gold, iron or tin from a slurry containing solids of a lower density and liquid and more particularly to such centrifugal concentrators of the batch type.

BACKGROUND

Various machines have been developed to separate particles of high density such as gold, iron or tin from tailings and other slurry streams using centrifugal concentration, using the centrifugal force created in a rotating bowl to separate the high density particles from the lower density slurry. The present applicant for example has invented batch centrifugal concentrators which are the subject of U.S. Pat. No. 4,824,431 and Canadian Patent no. 2149978, which are incorporated herein by reference. Such machines are designed to maximize the throughput of slurry, and are designed to withstand the heavy duty and wear arising from a relatively long-term operation at a mine. The rotating bowl is typically mounted on a shaft supported on large bearings, and is rotated by a motor beneath the machine which drives a drive belt connected to a sheave on the rotor shaft.

Artisanal or small-scale mining is a mining activity which involves people working with simple tools and equipment, outside the legal and regulatory framework. Currently, it is estimated that there are many millions of people involved in artisanal mining around the world and that number is growing with the elevated price of gold. It takes place in the remote parts of the world's poorest countries. It usually involves the activities of single individuals or a small group of individuals who are impoverished and exploiting marginal deposits in harsh conditions. One common form of artisanal mining is placer gold mining or panning for gold. In order to separate the retrieved gold from the ore, the artisanal miner will often crush the ore and use mercury which combines with the gold to form an amalgam, and which can be separated from the other material as "cake". The miners then heat the cake to burn off the mercury, leaving a residue of gold as well as causing health and environmental problems. There is therefore a need for a simple and inexpensive but environmentally safe method for artisanal miners to separate gold from particulate material.

SUMMARY OF INVENTION

In order to provide a simple, inexpensive centrifugal concentrator for use in artisanal mining or other applications, the invention provides a centrifugal concentrator in which there is a common shaft for the drive motor and concentrator bowl. The cost of bearing assemblies is thereby minimized. The bowl is preferably driven and suspended from above to keep the motor out of the slurry area and maximize the simplicity of the design. A fluidizing fluid is preferably delivered through the common shaft.

Thus according to the invention, an electric motor is provided with a hollow rotating drive shaft extending along the central axis of the motor, a stationary liquid supply line and a rotating union which communicates with the liquid supply line and the hollow interior of the drive shaft for supplying liquid to the hollow interior of the drive shaft.

BRIEF DESCRIPTION OF DRAWINGS

In drawings which illustrate a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
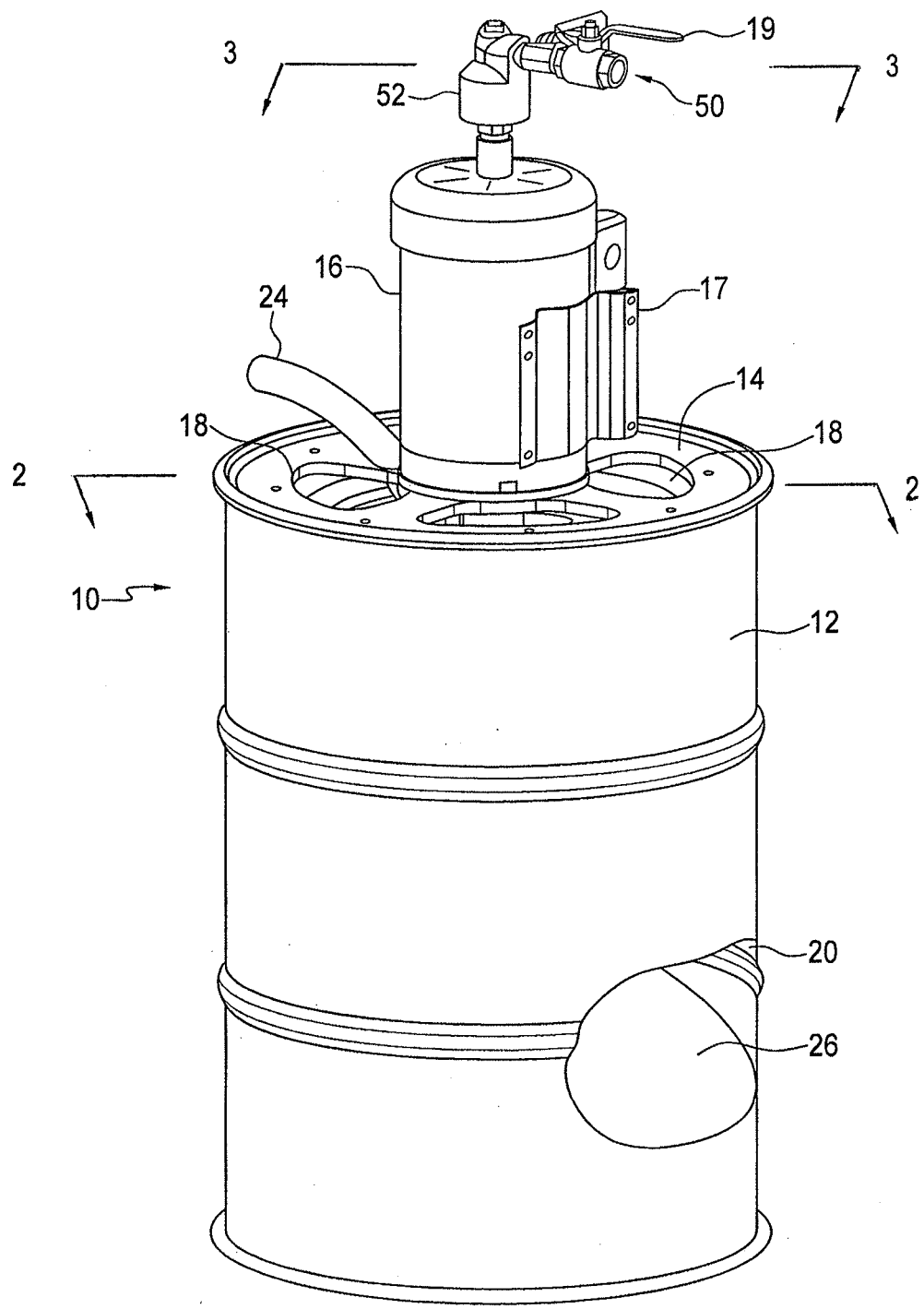
FIG. 1 is a perspective view of the centrifuge of the invention with water and power supplies and connections removed for ease of illustration.
Figure 2:
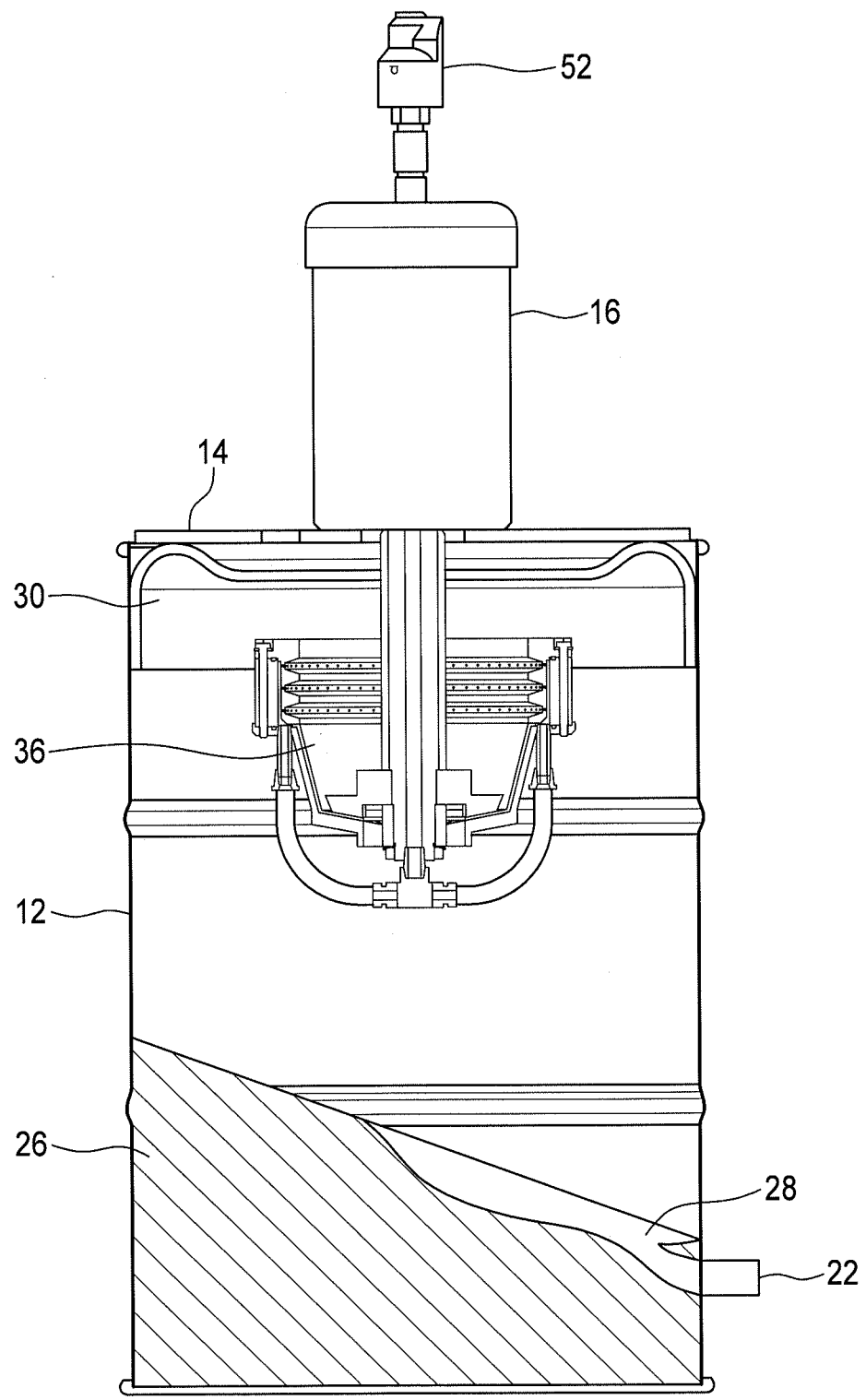
FIG. 2 is a partial vertical cross-section of the invention taken along lines 2-2 in FIG. 1.
Figure 3:
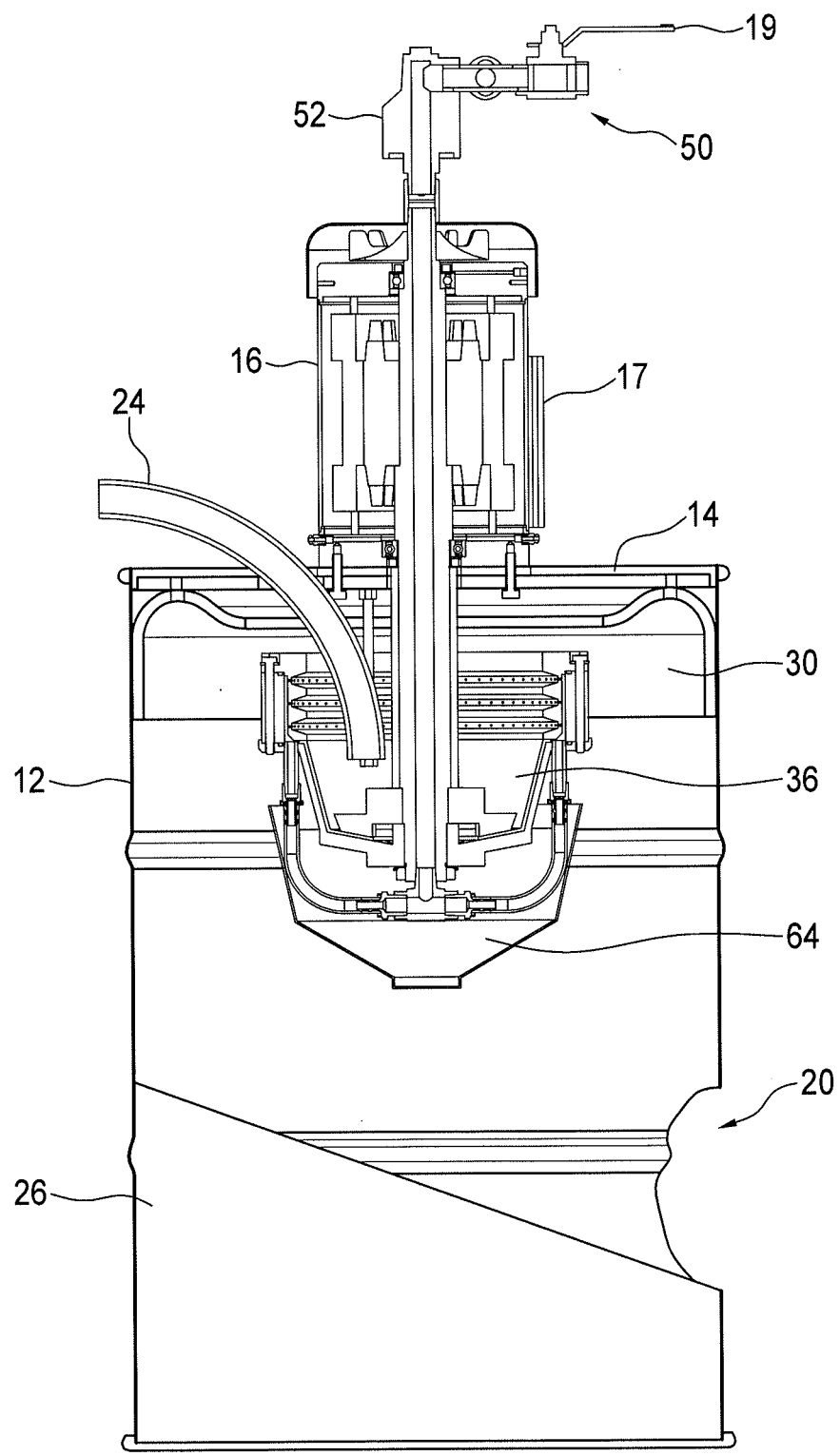
FIG. 3 is a vertical cross-section of the invention taken along lines 3-3 in FIG. 1.
Figure 4:
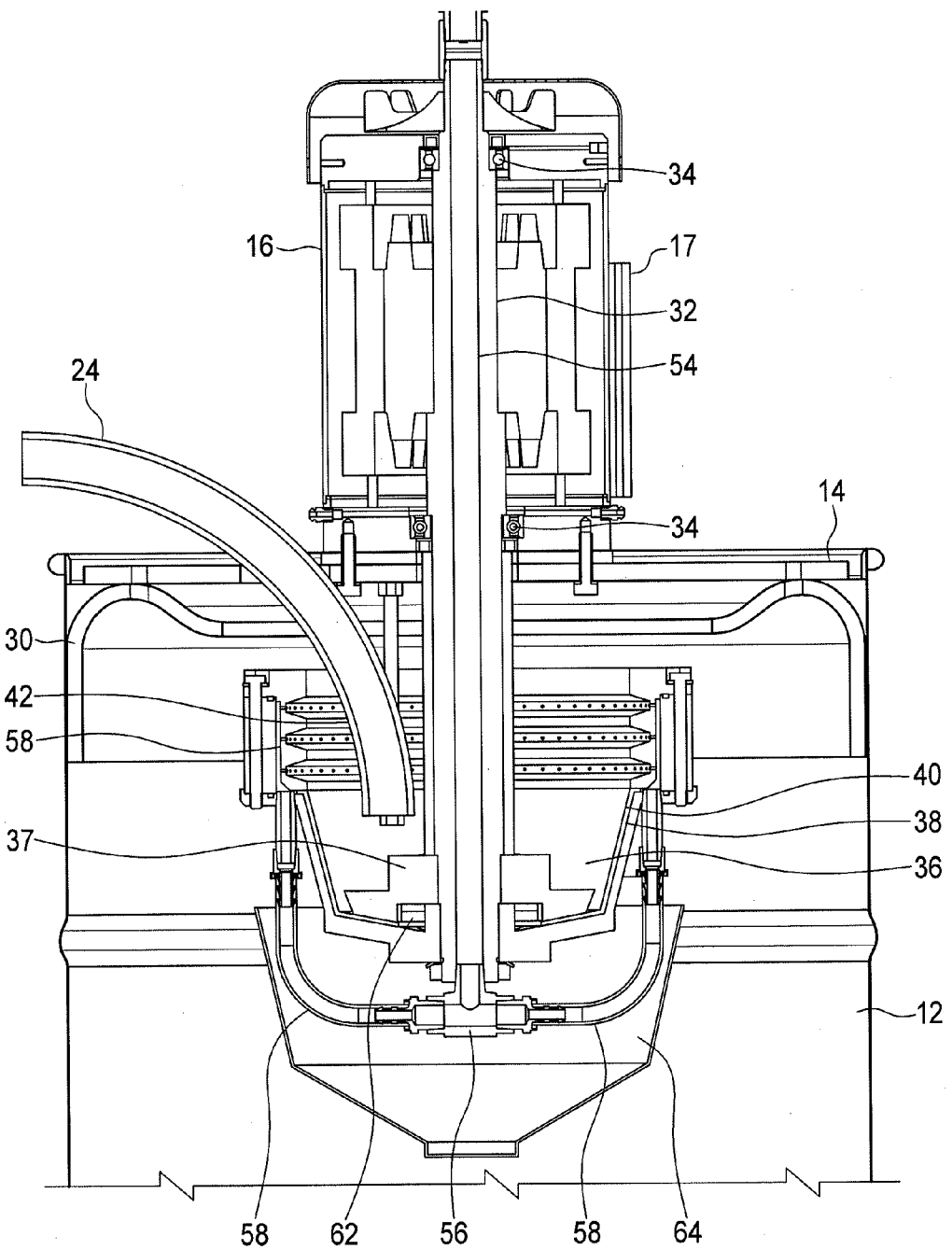
FIG. 4 is a detail cross-sectional view of the motor and rotor bowl as shown in FIG. 3.
Figure 5:
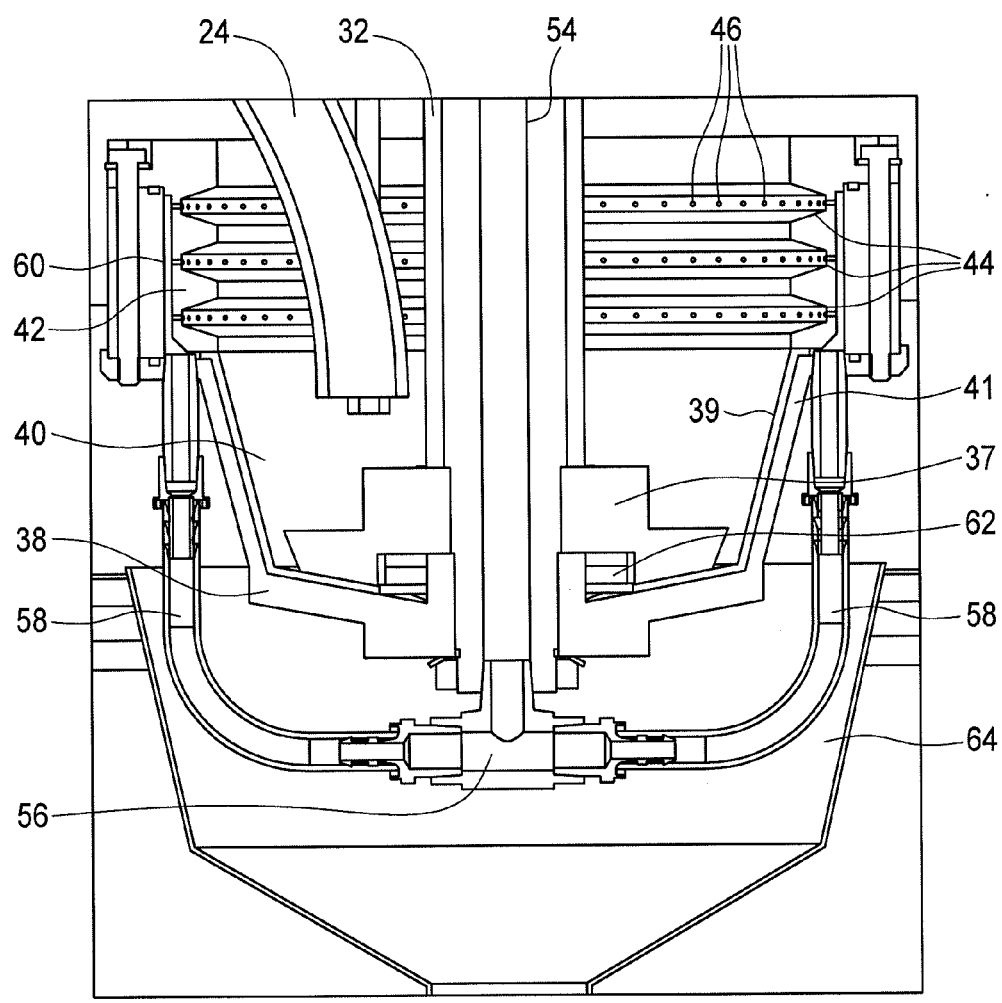
FIG. 5 is a detail cross-sectional view of the rotor bowl as shown in FIG. 3.
Figure 6:
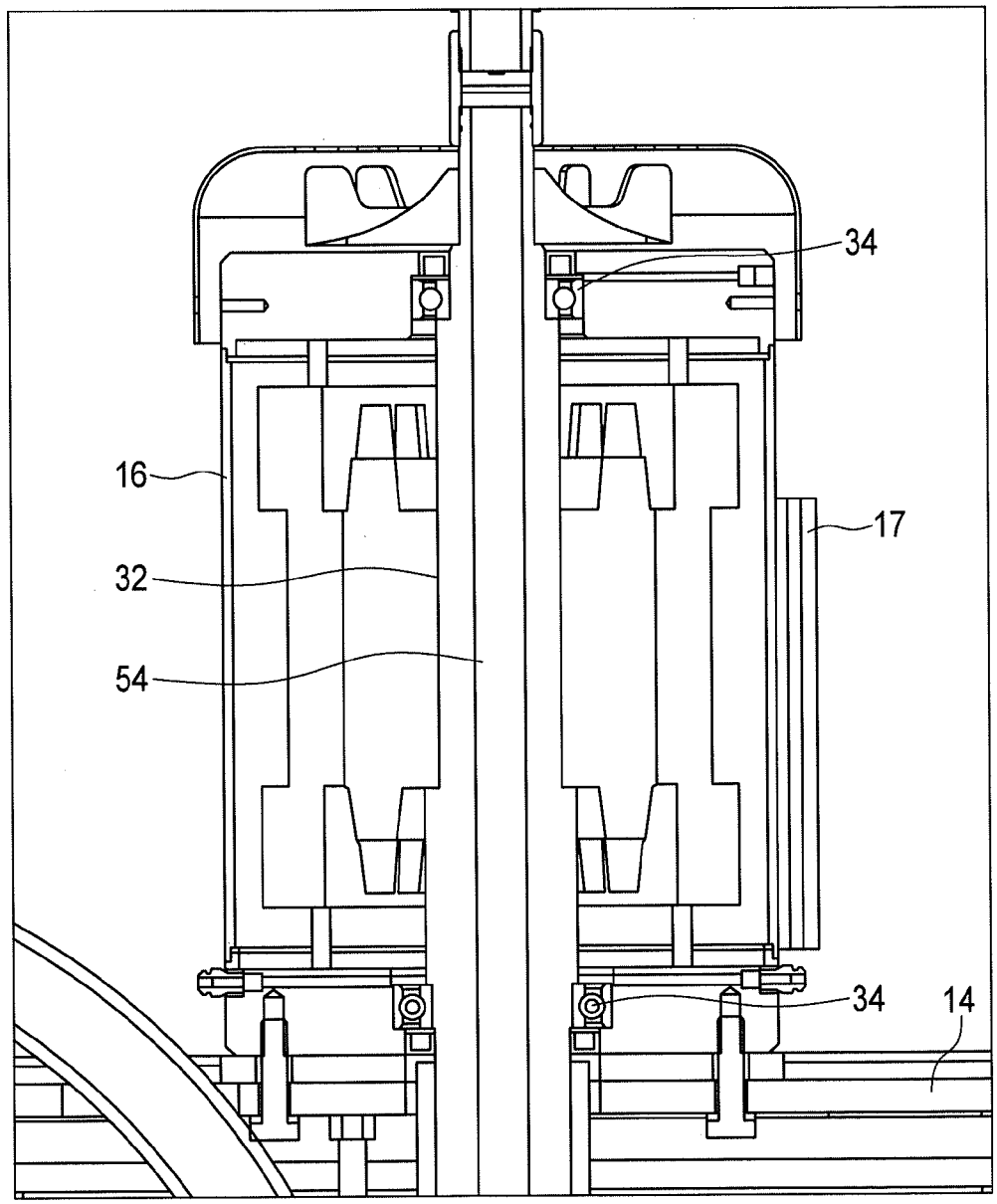
FIG. 6 is a detail cross-sectional view of the motor as shown in FIG. 3.

With reference to FIGS. 1 and 2, the centrifuge of the invention is designated by reference numeral 10. It has a rotor housing 12 comprising a hollow, rigid cylindrical drum, which is preferably formed from a standard 45-gallon drum. The top of the drum 12 is replaced with a motor support 14, which supports motor 16. Motor support 14 is provided with access openings 18 to provide access to the rotor 36 and motor support 14 provides a passageway for slurry feed pipe 24. Drum 12 also has a cut-out forming a concentrate access door 20 and a tailings discharge port 22 (FIG. 2). To stabilize the machine in operation, preferably the lower part of drum 12 is filled with concrete 26, the surface of which forms a drain to connect to outlet port 22 through channel 28. Secured to the underside of motor support 14 is annular rubber wear protector 30 which preferably is formed of a rubber automobile tire, having the same outer diameter as the inner diameter of drum 12, and which may be formed by cutting an automobile tire in half diametrically.

Motor 16 has a hollow drive shaft 32 (FIG. 3-6) mounted on bearing assemblies 34. Rotor 36 is mounted on the lower end of shaft 32. Rotor 36 has a rotor bowl 38 of the same general type as disclosed in Canadian Patent no. 2149978. An impeller 37 is provided on the center of the floor of steel lower bowl section 41. Impeller 37 has upstanding vanes to assist in the rotation of the slurry on the bottom of the rotor bowl 38 and to direct the slurry to the wall 39 of the rotor bowl. The wall 39 of rotor bowl 38 forms a smooth outwardly-inclined migration zone 40 lined with wear-resistant rubber, and a fluidized capture zone 42 above the migration zone, wherein the capture zone 42 has a number of fluidized annular cavities 44. Cavities 44 are provided with a fluidizing fluid under pressure through apertures 46. The capture zone is fluidized from a source of liquid under pressure located radially outwardly of the capture zone as follows.

Figure 7:
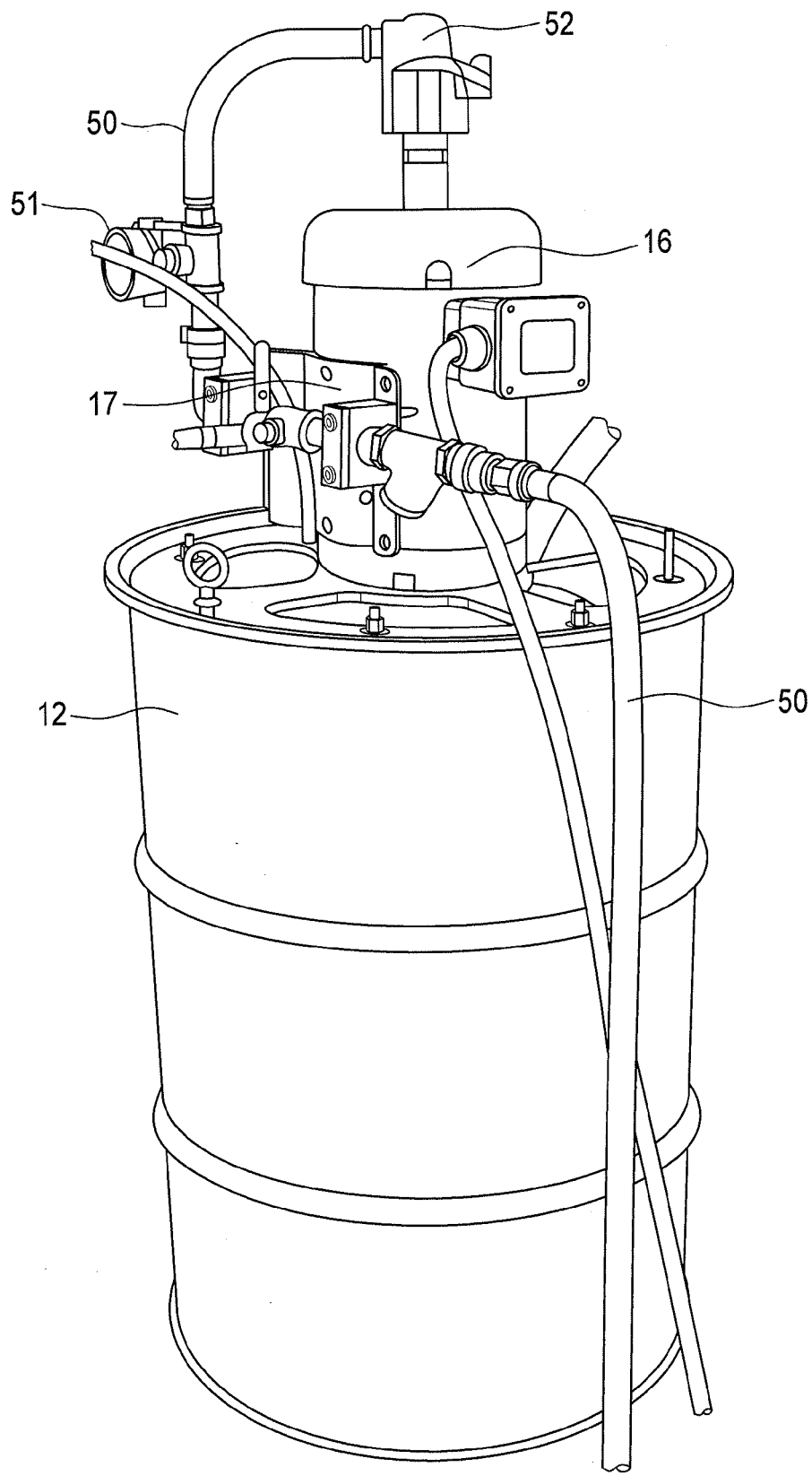
FIG. 7 is a perspective view of the centrifuge of the invention showing the water supply connections.

Fluidizing water under pressure is supplied to the cavities 44 from a stationary water supply line 50 which is connected to rotating union 52. Rotating union 52 provides the water from stationary water supply line 50 to water line 54 which runs down the center of hollow shaft 32. Hollow shaft 32 could itself also serve as the water supply line. Line 54 connects by a T-connection 56 to two rotating supply lines 58. Rotating supply lines 58 provide the water to manifold 60 which communicates with apertures 46. Supply line 50 is mounted to motor 16 by a bracket 17, and has a control valve 19 (FIG. 1) to regulate the flow and a pressure gauge 51 (FIG. 7) to monitor the pressure.

Motor 16 is, for example, a 2 horsepower 6 pole electric motor, suitable to be powered by a generator in a remote location, and which is modified to provide the hollow drive shaft described above. A frequency converter such as a Penta-Drive motor control can be provided with the power supply to control the speed of motor 16 in a range of about 900 to 1200 rpms.

In operation, initially motor 16 is activated to rotate the rotor 36. The slurry feed is introduced to the spinning rotor 36 through feed pipe 24. Centrifugal forces cause the slurry to climb up the inner surface of the rotor bowl 38 before being expelled over the upper rim of the rotor, against rubber tire 30 and thence out of the drum 12 through discharge port 22. Heavier target concentrate collects in fluidized cavities 44. As the process advances, when the cavities 44 have been sufficiently filled with target concentrate, power to motor 16 is stopped, the rotation of bowl 36 slows, and water is sprayed through openings 18 using a wash hose, and from apertures 46, to wash the concentrate out through channels 62 in the impeller 37 and lower floor of rotor bowl 38 and out through funnel 64. Either a container can be inserted under funnel 64 through access port 20, or a discharge pipe, not shown, can direct the concentrate outside the drum.

The combination of the channels 62 through impeller 37 and rotor bowl 38 to funnel 64 enables rapid concentrate recovery. This method of discharging concentrate around a rotor baffle in the bottom of the rotor is disclosed in U.S. Pat. No. 4,824,431 and Canadian Patent no. 2149978. It results in short off line time for rinsing concentrate, which is useful for tin and tantalum applications as well as gold. Having the drive/support for the rotor bowl above the rotor bowl allows a simple, stationary funnel unobstructed below the bowl with a hose attached to it to recover concentrate. The hose is ducted outside the drum. Recovering concentrate is the then done by washing it out around the baffle and into the funnel/hose assembly when the rotor is stopped or at least turning very slowly. This makes for rapid concentrate recovery after each concentrating cycle, which is important for applications where the gold is locked in another mineral, and also for tin and tantalum.

Figure 8:
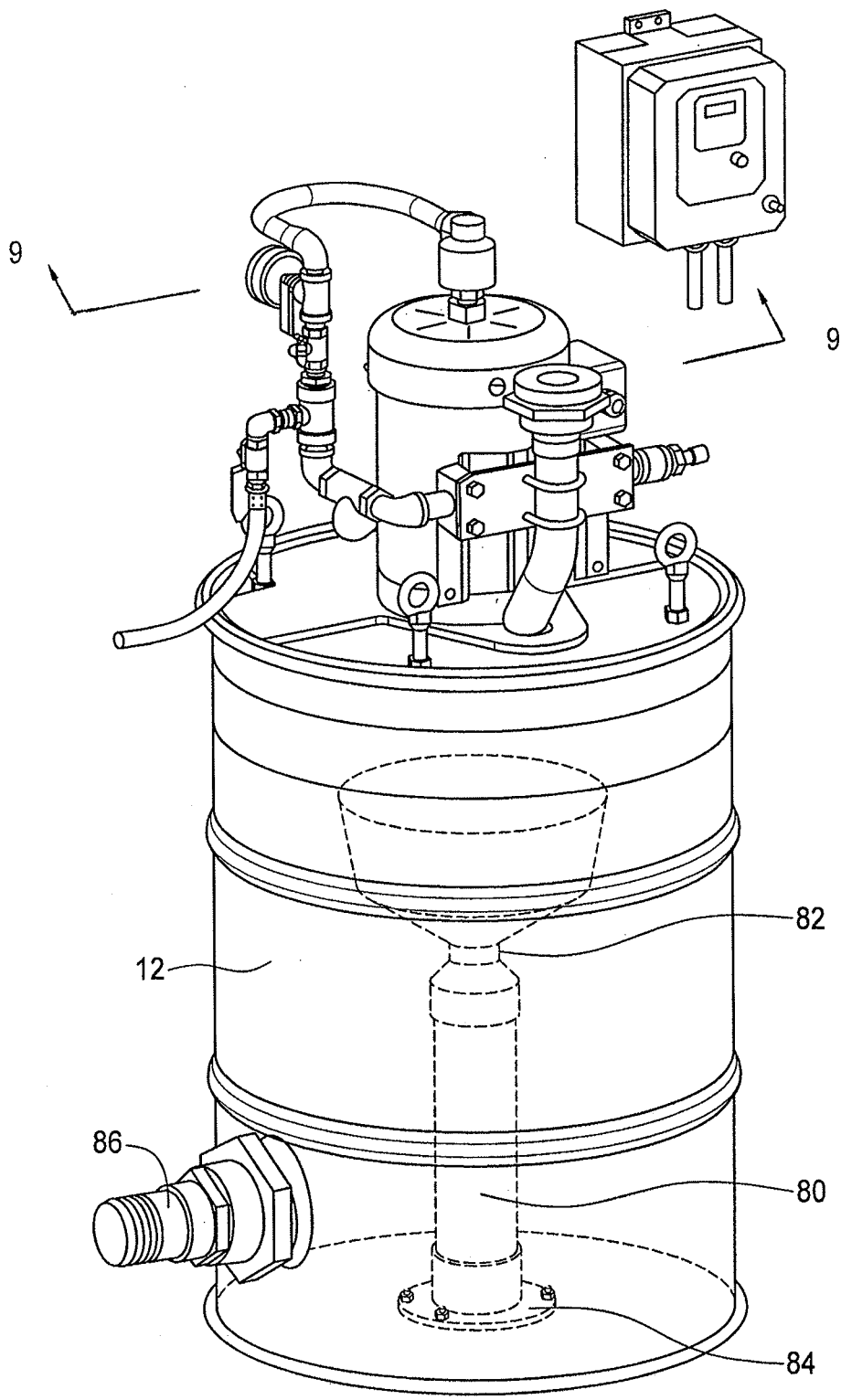
FIG. 8 is a perspective view of the centrifuge of the invention with a second embodiment of the tailings discharge arrangement.
Figure 9:
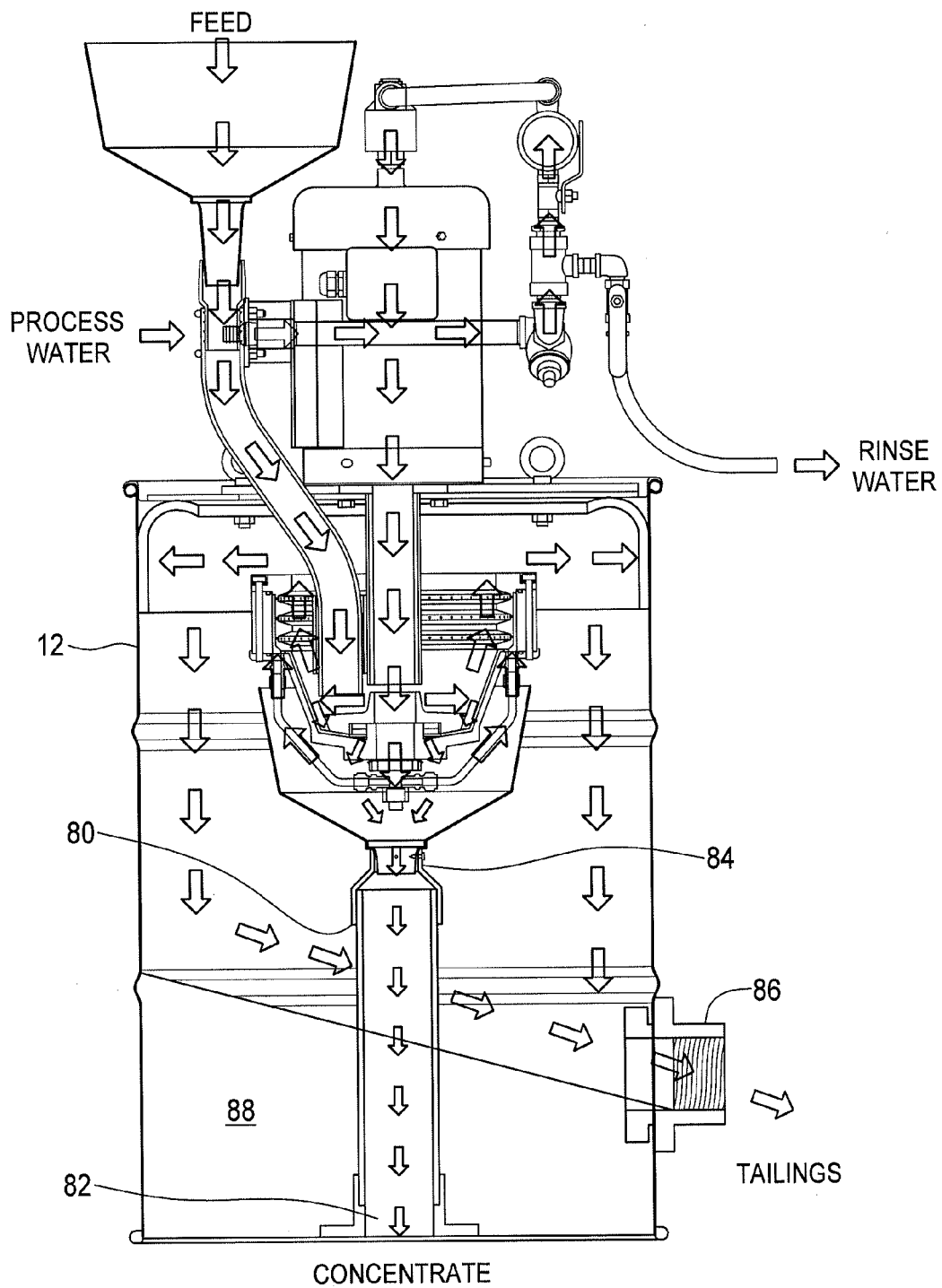
FIG. 9 is a cross-sectional view of the embodiment of FIG. 8 taken along lines 9-9 showing the flow of materials.

FIG. 8 shows a second embodiment of the tailings discharge in which a pipe 80 is connected at 82 to the outlet of bowl 38 to wash the tailings directly to an outlet 84 in the bottom of drum 12, as further illustrated in FIG. 9. In the embodiment shown in FIGS. 8 and 9, rather than providing concrete to stabilize drum 12, the sand and tailings 88 are allowed to build up in the bottom of the drum, below outlet 86, which serves to stabilize the centrifuge during operation.

While fluidizing water has been disclosed as the fluid being delivered through hollow shaft 32, other gases or fluids such as compressed air or hydraulic fluid may be delivered in the same way to the rotor. In this way the present applicant's variable lip centrifuge as disclosed in co-pending international patent application no. PCT/CA2006/000596, filed Apr. 13, 2006, which is incorporated herein by reference, could also be configured with the drive motor above and supporting the rotor.

While use of a fluidized capture zone has been disclosed above, the invention is also useful without a fluidizing section. In that case shaft 32 is solid, while maintaining the advantage that the shaft serves both as the motor drive shaft and to suspend the rotor. In this variant the machine can also be configured with the drive motor above and supporting the rotor. Since supply of fresh water for fluidizing is often difficult in the artisanal mining context, it may be preferable to construct the device in this way for some applications, though the capture of concentrate is less efficient than with the fluidized capture zone and more frequent stoppage of the device will be required.

By utilizing the shaft of the motor both to drive and suspend the rotor, the number of bearing assemblies and other moving parts required for the machine is reduced and the cost is thereby reduced. Allowing the miner to assemble the machine using local 45-gallon drums and tires further reduces expenses. The 45 gallon drum can also be used as a convenient shipping container for the machine. The bowl is preferably driven and suspended from above to keep the motor out of the slurry area and maximize the simplicity of the design. However the drive motor could also be mounted below the rotor while still using the common hollow shaft both to drive and support the rotor and deliver the fluidizing fluid.

The discovery that the hollow drive shaft of a motor can be used both to drive a rotating element and deliver a fluid has been found to have other useful applications, such as a lawn or garden sprinkler, wherein a series of liquid outlets is provided at the end of the hollow drive shaft. Where the liquid is air, the same arrangement can be used to inject air into the rotating agitator blade of a flotation machine. The same arrangement can be used to pass hydraulic fluid through one or more passages to power a tool attached to the rotating drive shaft.

As will be apparent to those skilled in the art, various modifications and adaptations of the structure above described may be made without departing from the spirit of the invention. While the preferred embodiment has been described in the context of the separation of higher density particles from a slurry, it will be apparent to those skilled in the art that the invention has similar application in the separation of any two flowable substances of differing density, whether solid particles from solid particles, liquid from liquid or solid particles from liquid.

What is claimed is:

1. An electric motor provided with a hollow rotating drive shaft rotatably driven by said motor, said drive shaft extending along the central axis of said motor and mounted on bearings for rotation about said central axis of said motor, said drive shaft having first and second ends, said electric motor further comprising a stationary fluid supply line and a rotating union which joins said fluid supply line and said first end of said drive shaft to thereby provide sealed fluid communication between said fluid supply line and the hollow interior of said first end of said drive shaft for supplying fluid to the hollow interior of said first end of said drive shaft, whereby a fluid is supplied under pressure from said stationary fluid supply line to the rotating second end of said hollow drive shaft when said electric motor is rotating said drive shaft; wherein said hollow drive shaft further comprises a hollow conduit mounted coaxially within and secured to said hollow drive shaft for carrying said fluid from said first end of said drive shaft to said second end of said drive shaft, said hollow conduit having a first and second end, whereby said rotating union joins said fluid supply line to said first end of said hollow conduit to thereby provide sealed fluid communication between said fluid supply line and the hollow interior of said first end of said hollow conduit for supplying fluid to the hollow interior of said first end of said drive shaft, whereby a fluid is supplied under pressure from said stationary fluid supply line to the rotating second end of said hollow drive shaft when said electric motor is rotating said drive shaft.

2. The electric motor of claim 1 wherein said second end of said drive shaft is in fluid communication with at least one fluid delivery line which rotates about said central axis of said electric motor when said electric motor is rotating said drive shaft.

3. The electric motor of claim 2 wherein said at least one fluid delivery line communicates with a fluid manifold which rotates when said electric motor is rotating said drive shaft, for delivery from said fluid stationary fluid supply line to said rotating fluid manifold.

4. The electric motor of claim 1 wherein said central axis is arranged substantially vertically.

5. The electric motor of claim 1 wherein said fluid is a liquid.

6. The electric motor of claim 1 wherein said fluid is a gas.

7. An electric motor comprising a rotor mounted for rotation about a central interior rotational axis of said electric motor and a hollow drive shaft mounted for rotation on and extending along the central rotational axis of said rotor, said hollow drive shaft having first and second ends extending axially from first and second ends of said electric motor to provide a rotatably driven output of said electric motor, said hollow drive shaft being rotatably driven by said rotor of said electric motor when said electric motor is electrically activated, said electric motor further comprising a stationary fluid supply line and a rotating union which joins said fluid supply line and said first end of said hollow drive shaft to thereby provide sealed fluid communication between said fluid supply line and the hollow interior of said first end of said drive shaft for supplying fluid to the hollow interior of said first end of said drive shaft, whereby a fluid is supplied under pressure from said stationary fluid supply line to the rotating second end of said hollow drive shaft when said electric motor is rotating said hollow drive shaft and wherein said second end of said hollow drive shaft is in fluid communication with at least one fluid delivery line which rotates about said central axis of said electric motor when said electric motor is rotating said hollow drive shaft.

8. The electric motor of claim 7 wherein said at least one fluid delivery line communicates with a fluid manifold which rotates when said electric motor is rotating said hollow drive shaft, for delivery of a fluid from said stationary fluid supply line to said rotating fluid manifold.

9. The electric motor of claim 8 wherein said central interior rotational axis of said electric motor is arranged substantially vertically and wherein said first end of said hollow drive shaft extends above said electric motor to communicate with said fluid supply line and said second end of said hollow drive shaft extends below said electric motor for delivery of said fluid to said rotating fluid manifold.

* * * * *